United States Patent [19]

Piola

[11] 4,137,119
[45] Jan. 30, 1979

[54] APPARATUS FOR MANUFACTURING POLES OF REINFORCED PLASTICS MATERIAL

[75] Inventor: Aldo Piola, Inverigo (Como), Italy

[73] Assignee: Dayton G.R.P. S.r.l., Milan, Italy

[21] Appl. No.: 763,550

[22] Filed: Jan. 28, 1977

[30] Foreign Application Priority Data

Jan. 29, 1976 [IT]  Italy .............................. 19717 A/76
May 14, 1976 [IT]  Italy .............................. 23285 A/76

[51] Int. Cl.² .......................................... B65H 81/00
[52] U.S. Cl. .................................... 156/431; 156/172
[58] Field of Search ............... 156/172, 171, 173, 175,
156/169, 166, 165, 425, 428, 430–431, 432, 161,
162, 165, 179, 392, 393; 242/7.21, 7.22;
138/144, 129, 153; 428/36; 214/1 P, DIG. 3;
198/728, 721, 735

[56] References Cited

U.S. PATENT DOCUMENTS

| | | | |
|---|---|---|---|
| 2,694,661 | 11/1954 | Meyer | 156/180 |
| 3,332,815 | 7/1967 | Havens | 156/175 |
| 3,401,789 | 9/1968 | Schuster | 198/728 |
| 3,429,758 | 2/1969 | Young | 428/36 |
| 3,527,636 | 9/1970 | Chartier | 156/173 |
| 3,567,542 | 3/1971 | Jackson | 156/173 |
| 3,646,610 | 2/1972 | Jackson | 138/129 |
| 3,673,028 | 6/1972 | Pearson | 156/172 |
| 3,709,754 | 1/1973 | Medler | 156/161 |
| 3,804,687 | 4/1974 | Peterson | 156/172 |
| 3,853,656 | 12/1974 | McNeely et al. | 156/172 |
| 3,916,500 | 11/1975 | Brown | 214/1 P |

Primary Examiner—Douglas J. Drummond
Attorney, Agent, or Firm—Fitch, Even, Tabin & Luedeka

[57] ABSTRACT

Apparatus for manufacturing poles of reinforced plastics material by advancing a prefabricated hollow core of plastics material coaxially with a plurality of resin impregnated reinforcing threads, the threads being held tight and radially distributed around the core and being caused to adhere thereto, spirally winding at least one impregnated reinforcing thread around to at least partially cover the core and impregnated reinforcing threads during their advance, and leaving the core and the impregnated reinforcing threads to harden to obtain the union of the threads with the core.

3 Claims, 8 Drawing Figures

APPARATUS FOR MANUFACTURING POLES OF REINFORCED PLASTICS MATERIAL

The present invention relates to apparatus for the manufacture of cylindrical or conical poles of reinforced plastics material, for various applications, in particular for supporting outdoor illuminating apparatus or low and medium voltage electric lines.

According to the prior art, poles of the above indicated type, having lengths variable between 9 and 15 meters, with external base diameters varying from 170 to 360 mm and at their tops varying from 75 to 180 mm, are conventionally manufactured by stamping, with plastics material reinforced with mineral fibers and additives, two half shells inserting in the thickness of the half shells, during their stamping phase, a plurality of metallic rods peripherally distributed and extending substantially the whole length of each semi-shell, connecting the two semi-shells along their respective longitudinal borders and leaving them so polymerize and harden the plastics material used to obtain the finished hollow pole.

The insertion of reinforcing wires, metal rods in particular, is made necessary, according to the prior art, by the fact that the pole must have a sufficient resistance to combined bending and compressive stress and present a deflection when subjected to an applied horizontal pull at its free end, not greater than a pre-established limit, for example of the installation regulations for illumination poles or poles for low and medium voltage electric line. In fact the use of reinforced plastics material with the addition, for example, of short glass fibers in the mixture, does not permit the obtaining of the resistance characteristics required by the regulations or at least without resorting to notable pole thicknesses which, beyond making the manufacturing cost prohibitive, produces an intolerable increase in weight. The prior art of manufacturing poles reinforced with metallic threads or rods, beyond presenting difficulties of manufacture, specially in phase of inserting the threads which, being long, can become entangled, also in their radial distribution in the semi-shells of each pole, which does not lend itself to automation and thus lengthens the time necessary for the manufacture of a pole, which notably increases its cost.

Further, the thickness of a pole cannot descend below determined values in that it is necessary to bear in mind the diameter of the threads or metal rods which must be contained in the thickness itself.

The aim of the present invention is therefore that of manufacturing hollow poles of reinforced plastics material which, having the same resistance to combined bending and compresive stress and deflection at their free ends when subjected to a determined horizontal pull, with respect to prior art poles, are noticeably lighter, and therefore more easily transportable and can be manufactured with a higher degree of automation so as to considerably reduce the manufacture time.

According to one aspect of the invention there is provided apparatus for manufacturing poles of reinforced plastics material comprising means for advancing a prefabricated hollow core of plastics material of predetermined length coaxially with a plurality of reinforcing threads impregnated with resin compatible with that of said hollow core, said impregnated reinforcing threads being held tight and circumferentially distributed around said hollow core and being caused to adhere thereto, spirally winding at least one impregnated reinforcing thread around to at least partially cover said core and said impregnated reinforcing threads, during the advance thereof, and leaving said core and said impregnated reinforcing threads to harden to obtain the union of said impregnated reinforcing threads with said core.

In accordance with a particularly advantageous aspect of the invention, after the spiral winding of the impregnated threads, the hollow core is subsequently caused to advance in parallel with its own longitudinal axis and is completely covered with an external coat of a film of material impermeable to air.

With the invention there is obtained the advantage of being able to manufacture in an automated way not only single poles but also a succession of poles in a continuous process, by advancing hollow cores one after the other, this continuous process requiring the cutting of the longitudinal reinforcing threads and those spirally wound, together with the possible continuous film layer, between the trailing end of one core and the leading end of a second core coaxially advancing therewith.

Further, with the provision of the winding of material impermeable to air, there is provided the advantage of external covering which, isolating from the air the plastics materials used and the impregnated resins of the reinforcing threads, accelerates and facilitates their catalization beyond providing the pole with an external surface of notable homogeneity.

The invention will now be more fully described, by way of non-limiting example, with reference to the accompanying drawings in which.

Referring to the drawings, the numeral 1 indicates a base frame supporting, by means of a plurality of pairs of hydraulic jacks 2,3 of vertical axis, a roller bed 4, whose rollers 5 are destined to rotatably support prefabricated tubular cores 6.

Figure 7:
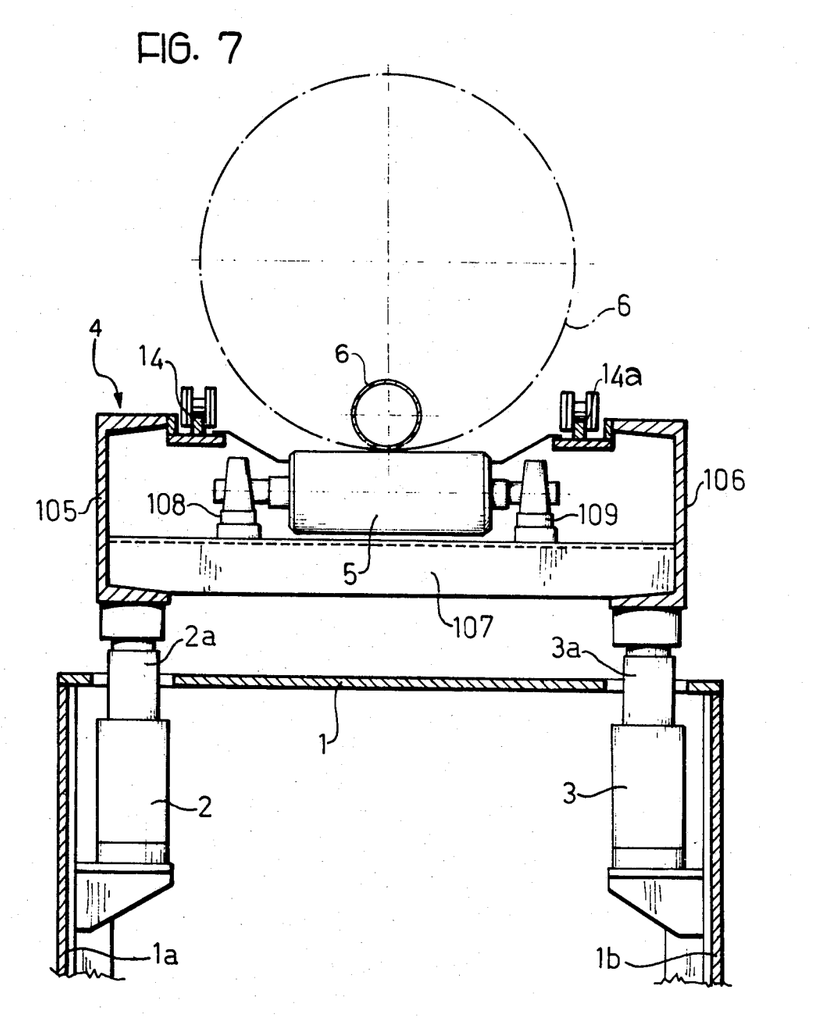
Figure 8:
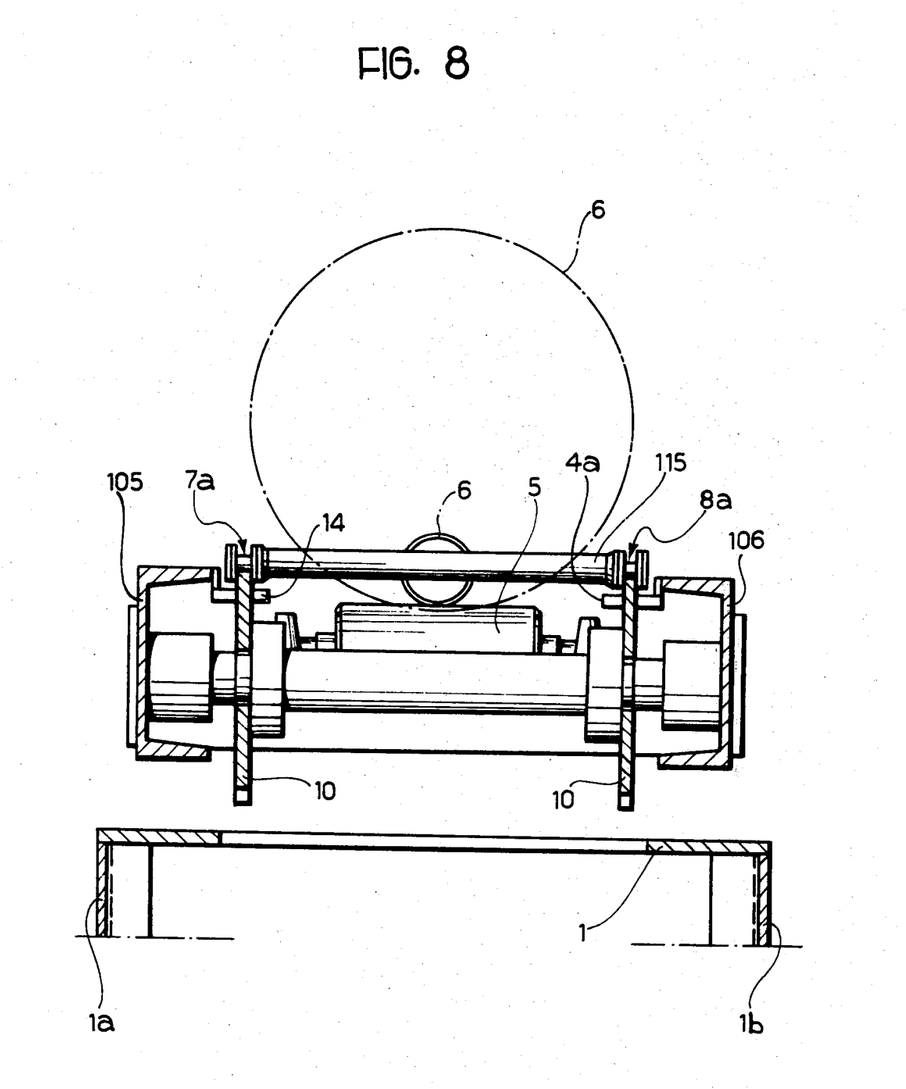

With reference to FIGS. 7 and 8, said roller bed essentially comprises a pair of longitudinal members 105, 106 of C-form, with horizontal wind pieces, reciprocally hardened and distanced from a plurality of transverse members 107. The lower wind pieces of said longitudinal members are fixed on the movable elements 2a, 3a of the hydraulic jack 2,3. Each of the transverse members supports, by means of supports 108, 109, a corresponding free roller 5 having its horizontal axis perpendicular to the said longitudinal members. The numerals 7 and 8 indicate two equal chains, supported internally of the bench 1 and in correspondence with its sides 1a and 1b, by corresponding chain wheels, all indicated by the numeral 9, rotatingly supported on the sides themselves and by chain wheels 10, 11 rotatably mounted on the roller bed 4 in correspondence with its upstream and downstream ends with reference to the direction of advance indicated by arrow A in FIGS. 1 and 2. The chains 7,8 are moved by motorized wheels 12 in their turn operated by a motor 13, supported on the base 1, to which they are kinematically connected in a conventional way, for example by means of chain transmission 13a. The upper horizontal arms 7a, 8a of the chains 7,8 extend longitudinally throughout the length of the roller bed 4 at a higher level than that of the rollers 5 and are guided by respective rods 14, 14a supported on the upper wind pieces of the longitudinal members 105, 106 of the roller bed 4 (FIG. 7).

Figure 2:
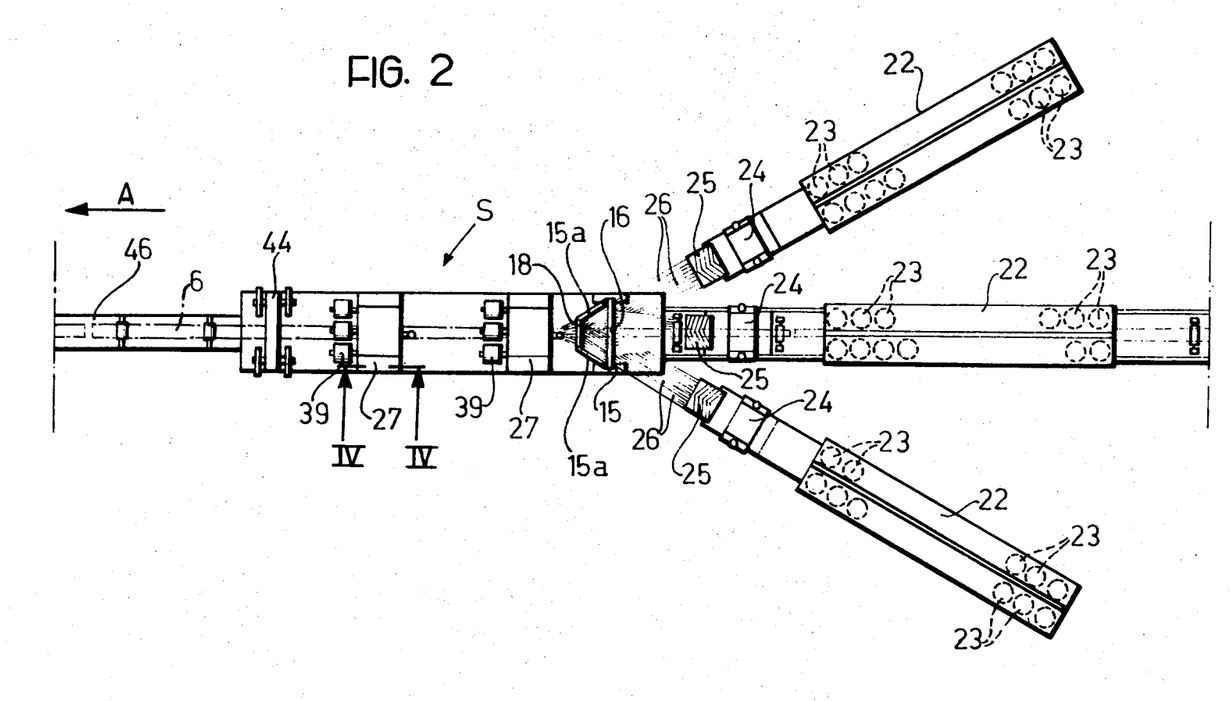
FIG. 2 illustrates the apparatus of FIG. 1 in schematic plan view.
Figure 4:
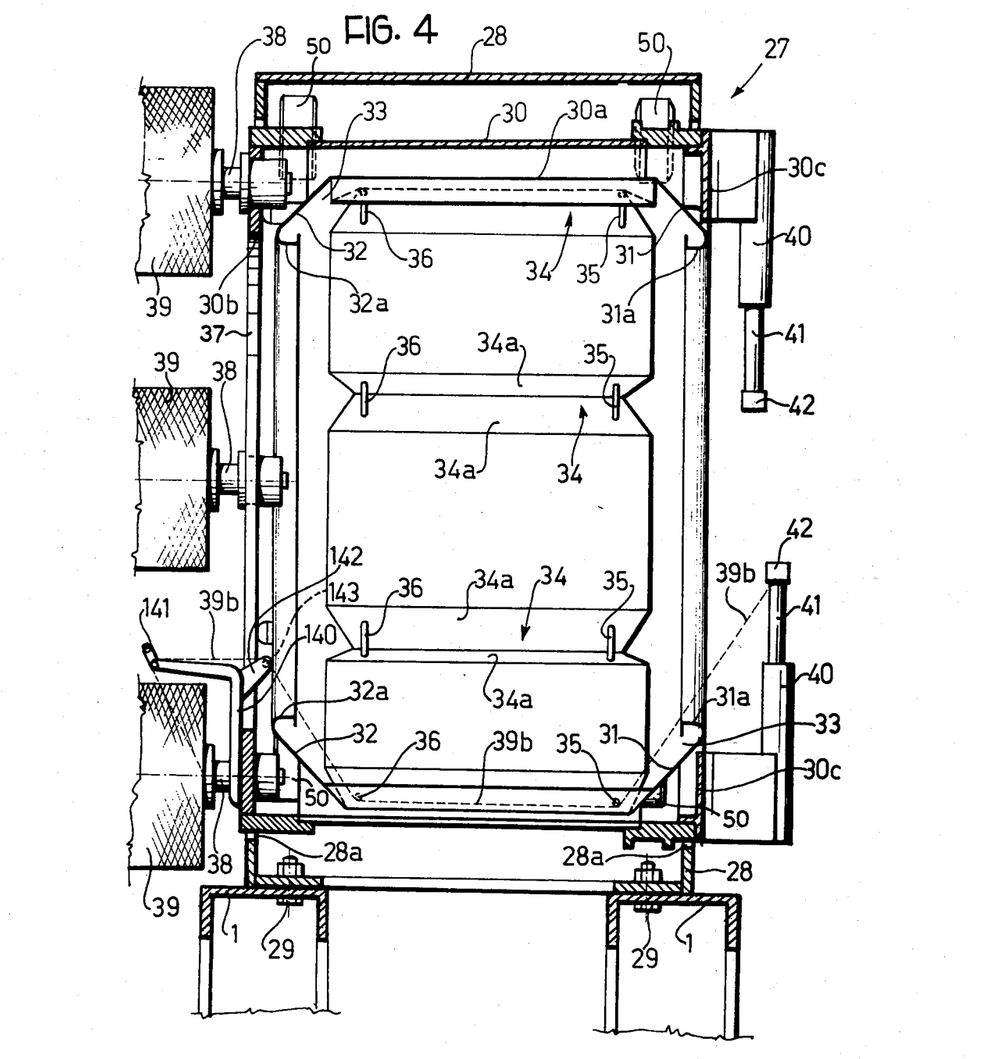
FIGS. 4 and 5 illustrate, in enlarged scale, sections taken along lines IV—IV and V—V of FIGS. 2 and 1 of the transverse binding device used in the apparatus of the invention.
Figure 5:
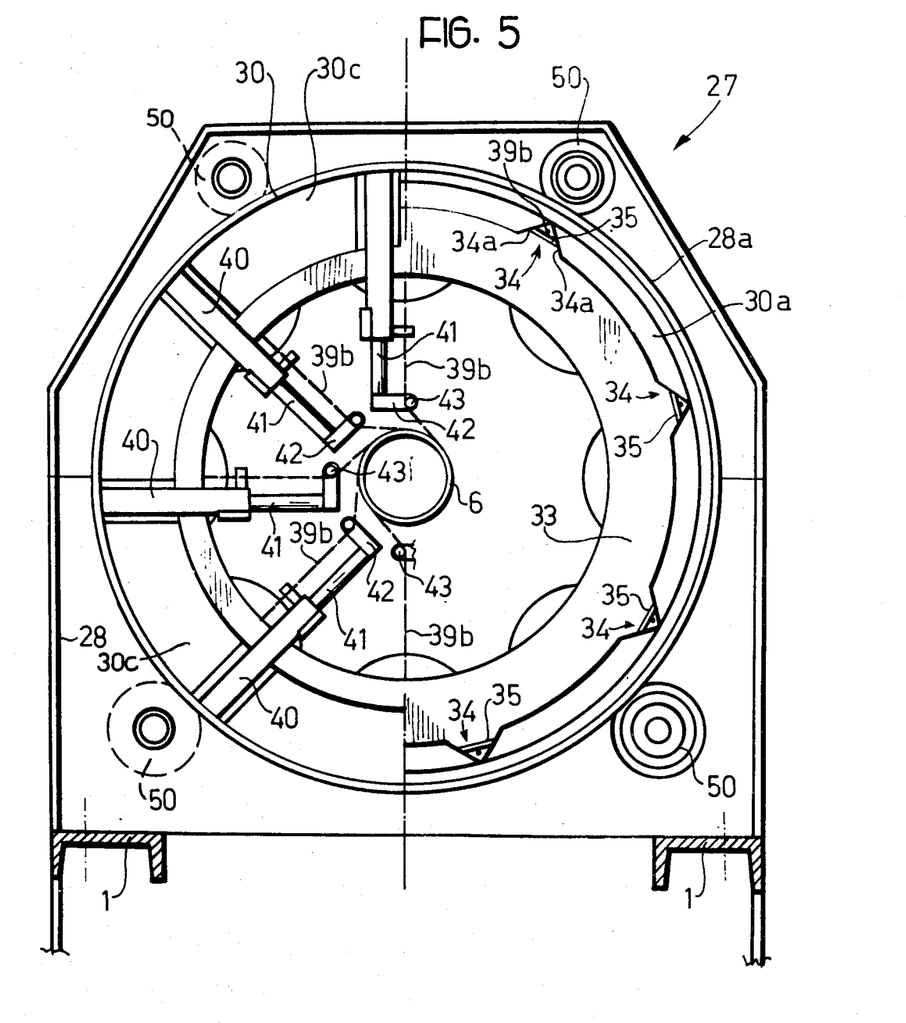
Figure 6:
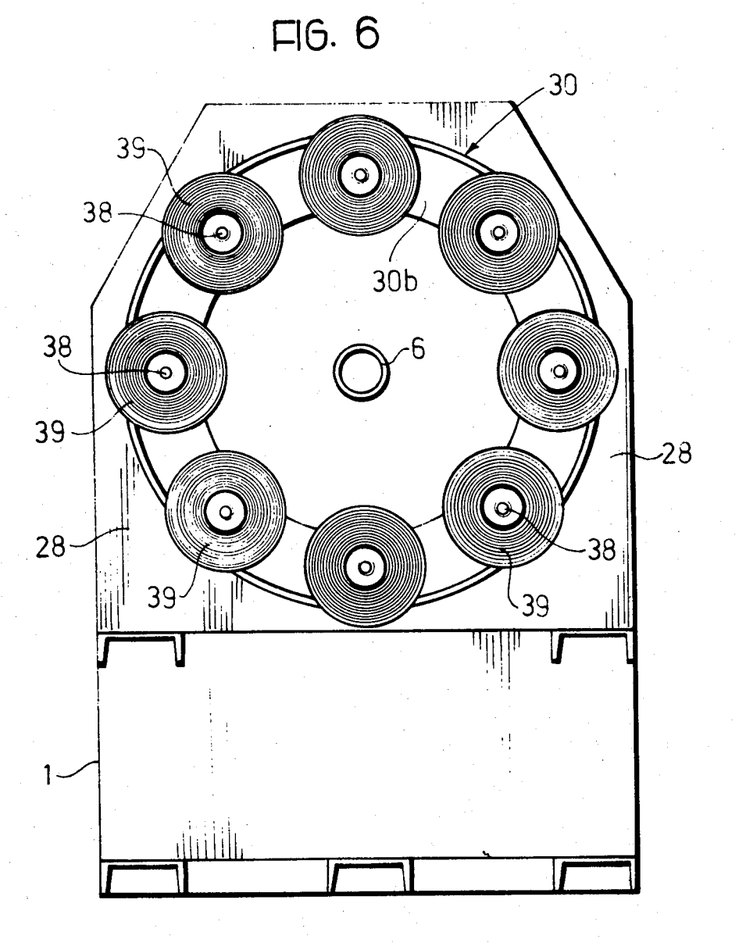
FIG. 6 illustrates, in rear side view, the device of FIG. 5, and FIGS. 7 and 8 illustrate, in enlarged scale, sections taken along lines VII—VII and VIII—VIII of FIG. 1.

Four cylindrical shafts 115, one of which is indicated at FIG. 8, extend transversely with respect to the direction of advance A and are fixed, in a predetermined position, to internal opposite rings of the chains 7,8. These shafts constitute pushers for the tubular cores 6, as will be described later, and are distanced one from another, throughout the length of the chains 7,8, by a length equal to the predetermined length of the cores 6. The bench 1 supports, downstream of the roller bed 4, a frame 15 which supports an annular metal disc 16, of predetermined thickness, having a central circular aperture 17 and having its axis parallel to the direction of advance A, this diameter being only slightly greater than the maximum external diameter of the tubular cores 6, the frame 15 also supports by means of brackets 15a, a second annular metal disc 18 positioned downstream of the disc 16 and coaxial with it. The disc 18 is also provided with a central aperture 19, equal to the aperture 17 of the disc 16. The discs 16,18 are peripherally and circumferentially provided with an equal number of holes 20 and 21, respectively, having their axes circumferentially equally spaced one from the other and parallel to the direction of advance A. These holes, as will be described later, have a thread guiding function. The apparatus according to the invention also comprises three equal supports, of conventional type, each of which is indicated by the numeral 22, provided upstream of the frame 15 and angularly disposed as illustrated in FIG. 2. Each support 22 rotatably supports a plurality of bobbins 23 of reinforcing thread (fiber glass) and is provided, at its part facing the frame 15, with a bath 24 of resin for the impregnation of the threads, followed by a conventional scraper, schematically illustrated at 25, for the elimination and recovery of excess resin from each thread. The reinforcing threads 26, picked up from each thread bobbin 23 are manually inserted in the corresponding holes 20,21 of the discs 16,18, and the plurality of threads thus disposed are connected downstream of the disc 18. The letter S in FIGS. 1 and 2 indicates a transverse binding station, supported by the base 1 downstream of the disc 18, with reference to the direction of advance A. This station S is comprised of two equal devices, both indicated with the numeral 27, supported spaced out from one another on the base 1. With reference to FIGS. 4 and 5, each of the devices 27 is constituted by an encasing framework 28, fixed by conventional means, for example screws and bolts 29, on the base 1. The framework 27 defines a cylindrical seat 28a coaxial with the discs 16,18, in which there is rotatably and coaxially mounted a hollow cylindrical drum 30, provided, in correspondence with the opposite basis, with equal annular edges 30b,30c. In this drum 30 there is coaxially fixed, by means per se known and not represented, a further hollow drum 30a of sheet metal provided, in correspondence with the opposite basis, edges 31,32 which are inclined and terminate with portions 31a and 32a bent inwardly.

With reference to FIG. 4, the edges 31 and 32 form, with the cylindrical wall of the drum 30a, an annular chamber 33, opened towards the interior of the drum itself. The cylindrical internal wall of the drum 30a has, in transverse section, a profile substantially saw-like due to the presence of triangular recesses 34, which extend in parallel to the generatrix of said cylindrical wall and which are circumferentially equally spaced by a predetermined distance. The numerals 35 and 36 indicate two bars fixed at the opposite inclined walls 34a, 34a of each recess 34, in correspondence with their ends.

The edge 30b of the drum 30 supports, by means known per se and shown schematically at 37, a plurality of pins 38, extending in parallel to the axis of the drum itself and regularly circumferentially distributed around the edge.

On each of the pins 38 there is rotatably mounted in a known manner a bobbin 39 of, for example, reinforced glass fiber 39b. The number of pins 38 and, therefore, of bobbins 39 is equal to the number of recesses 34, provided in the internal cylindrical wall of the drum 30a. Also on the edge 30b and in proximity to each bobbin 39, there is fixed a bracket arm 140 which supports a thread guide 141 and, by means of a couple of lugs 142 extending towards the interior of the drum 30a, a free return roller 143.

At the edge 30c of the drum 30, facing the discs 16,18 there is fixed a plurality of arms 40, radially extending with respect to the drum itself. In prolongation of each arm 40 there is provided a shaft 41 terminating, at its free end, in a projection 42 which supports a thread guide 43.

The shaft 41 is slidable from and within the corresponding arm 40 and is locable in a desired position by conventional means which are not illustrated. Also the number of arms 40 is equal to the number of recesses 34 provided in the internal cylindrical wall of the drum 30a.

The means comprising the two drums 30, 30a is caused to rotate around its longitudinal axis by means of a roller 50 in frictional contact with the cylindrical wall of the drum 30, which wheel is driven by a motor (not represented). On the base 1 downstream of the transverse binding station S, there is provided a conventional tape winder, schematically represented at 24, of the type comprising a plurality of tape bobbins 45. The bench 1, downstream of the winder 24 supports, by means of an articulated parallelogram system, a roller bed 46, positionable to a desired level by the parallelogram system by a conventional manually actuable means.

On the roller bed 4 there is placed, for example manually, a tubular core 6 prefabricated by conventional method using, for example, thermosetting polyester resin and reinforced epoxy resin. This tubular core 6, which can be cylindrical or tronco-conic, is disposed with its axis parallel to the direction of advance A and in such a way that a pusher 115 of the pair of chains 7,8 is in contact with its trailing end. The roller bed 4 is then, by means of the hydraulic jacks 2, 3, raised to a level such that the axis of the tubular core 6, supported thereon, coincides with the axis of the discs 16 and 18. From each bobbin 23 of the supports 22 there is manually drawn a reinforcing thread 26 which, after passing through the corresponding resin impregnation bath 24 and over the scraper 25 for the elimination and recovery of a possible excess of resin, is inserted in the respective holes 20 of the disc 16 and 21 of the disc 18.

Downstream of the disc 18, all the threads 26 are reciprocally united, by knotting, for example, in such a way that their connection (knot) lies on the axis of the discs 16,18.

In the transverse binding station S, from each bobbin 39 of the rotating drums 30 there is taken a corresponding thread 39b which, after insertion in the conventional thread guide 141, enters the annular chamber 33 in correspondence with the base of a respective seat 34 and, subsequently, is engaged in a corresponding thread guide 43. The thread 39b, which can obviously be substituted by a tape or similar element preferred to effect, as will be described, a transverse binding, is maintained in proximity with the base of the corresponding seat 34, for passage below the bars 35,36. The shafts 41 are fixed to the respective arms 40 in such a way that their ends 42 essentially contitute a circular envelope of greater diameter than the diameter of the tubular core carried on the roller bed 4. With conventional means not illustrated, in the annular chamber 33 there is provided a predetermined quantity of resin for impregnation of transverse binding threads or the like 39b.

The apparatus of the invention is now ready to initiate an operative cycle.

Starting up the motor 13, a prefabricated tubular core 6 carried on the roller bed 4 is pushed by a pusher 115 and the chains 7,8 towards the circular orifice 17 of the first disc 16, and subsequently, through the circular orifice 19 of the disc 18. Passing through the disc 18, the leading end of the tubular core 6 encounters a knot of the plurality of reinforcing threads 26, impregnated with resin, which, while the core proceeds in its advance towards the transverse binding station S, is pushed by the leading end of the core. During this movement downstream of the disc 18, the plurality of threads 26 dispose themselves on the tubular core 6, in parallel to its generatrix and with a regular distribution due to the regularity of distribution provided with the holes 21 of the disc 18. When the leading end of the tubular core 6 with its respective longitudinal reinforcing threads 26, reaches the opening defined by the thread guides 43 of the first device 37 of the transverse binding station, the ends of the threads 39b which jut from the thread guides are fixed tangentially in a known manner on the core after which the means constituted by drums 30, 30a are caused to rotate. With this rotation, while the impregnation resin carried in the annular chamber 33 occupies, by centrifugal force, the entire chamber and thus provides impregnation of the threads 39b which cross the respective recesses 34, the threads 39b are spirally wound on the core 6, provided with the longitudinal threads, which continues to advance towards the device 27. There is thus obtained an essentially transverse first binding of the longitudinal threads 26. The said spiral winding has a predetermined pitch, in accordance with which there is selected the value of the speed of rotation to impart to the means constituted by the drum 30,30a. Proceeding in its advance downstream, the tubular core 6 provided with the longitudinal threads 26, transversely bound by threads 39b of the first device 27, arise at the opening formed by the thread guides 43 of the second device 27. Proceeding analogously to that described in connection with the preceding device 27 with the sole variant of attributing to the means constituted by the drums 30,30a a contrary rotation direction to that of the first device 27, there is obtained a second transverse binding, crossing that previously obtained.

When, because of the said advance downstream of the first tubular core 6, the roller bed 4 is free to take a second tubular core 6a, a second tubular core is disposed thereon so that a pusher 115, behind the pusher previously described, provides the desired advance of the two cores 6,6a.

Leaving the transverse binding station S, the tubular cross 6,6a, longitudinally reinforced with resin impregnated threads 26 and transversely bound with cross layers of threads 39b, also impregnated with resin, cross the winder 44 where they are subjected to a final winding of a film 45 of appropriate material, preferably constituted by Mylar. With the application of the film 45 there is obtained a covering impermeable to air of the longitudinal threads and the spirally wound threads which accelerates and facilitates the polymerization of the impregnation resin of the threads themselves and also confers a particularly homogeneous aspect to the external surface of the finished poles. Leaving the winder 44, the finished poles advance on the bed 46, positioned at a convenient level, from where they are unloaded and sent for storage after cutting of the longitudinal threads 26, of the binding threads 39b and of the winding tape, between one pole and another.

After the unloading of the first pole, the apparatus functions continuously without further manual intervention, apart from that provided for initial loading of successive tubular cores 6,6a in reciprocal axial head to tail position on the roller bed 4. Naturally even this loading operation can be mechanized and automated in operative sequence with all the other operations of the apparatus.

According to the invention poles obtained with characteristics such as to amply satisfy the ECN (European Normalization Committee) both for lighting poles and for those destined for low and medium voltage electric lines, with a notable saving in material, thus also weight and cost, also due to the possibilities of automated manufacture.

For example, using an orthophthalic polyester resin, spread on a conical spindle and winding thereon a mat of fiber glass a hollow core of 9 m. length, with a base diameter of 177 mm and head diameter of 76 mm is produced. The thickness, uniform for the entire length of the core, is about 4 mm. This core has been subjected to the process according to the invention, after having been extracted from the spindle, using longitudinal glass fiber reinforcing threads, with more filaments. More precisely, there have been employed 35 threads, each having 60 filaments, uniformly distributed around the outer surface of the hollow core. The threads have been impregnated with the same orthophthalic polyester resin with which the hollow core was made. After adhesion of the external surface of the hollow core, each thread practically covered a circumferential zone of about 5 mm.

On the longitudinal threads were then spirally wound two glass fiber threads each thread being formed of 20 filaments. For the impregnation the same orthophthalic polyester resin as that which impregnated the longitudinal threads was used. The first thread was wound with an inclination of about 10° with respect to the longitudinal axis of the hollow core while this second thread was would with the same inclination, but in the opposite direction. Above the braiding formed by the spiral threads there was finally laid down a continuous winding with a film of material impermeable to air, known in commerce under the name "Mylar". After catalyzation and hardening of the resin, the pole obtained has a thickness equal to 6.8 mm. The pole was inserted into the ground to the length of a meter, leaving a length of 8 meters above ground. Subjected to a horizontal pull at the head, it was discovered that the maximum deflection of 22.7 cm. adhered to the ENC regulations for this type of pole, which is subjected to a pulling force of about 24.1 kg.

Rupture takes place instead at a pulling force equal to 170 kg after having undergone a deflection of about 160 cm. The pole, although not being reinforced with metallic rods and being much lighter had a functional behaviour plainly satisfying the ENC requirements.

Referring again to FIGS. 1, 2 and 3 it is observed that in the case of the continuous manufacturing process using cores of conical profile, the insertion of the core 6a behind the core 6 is effected by ensuring that the forward end of the core 6a has the same diameter as the trailing end of the core 6 which precedes in such a way as not to have a sudden variation in diameter in the passage from one core to the next.

Figure 1:
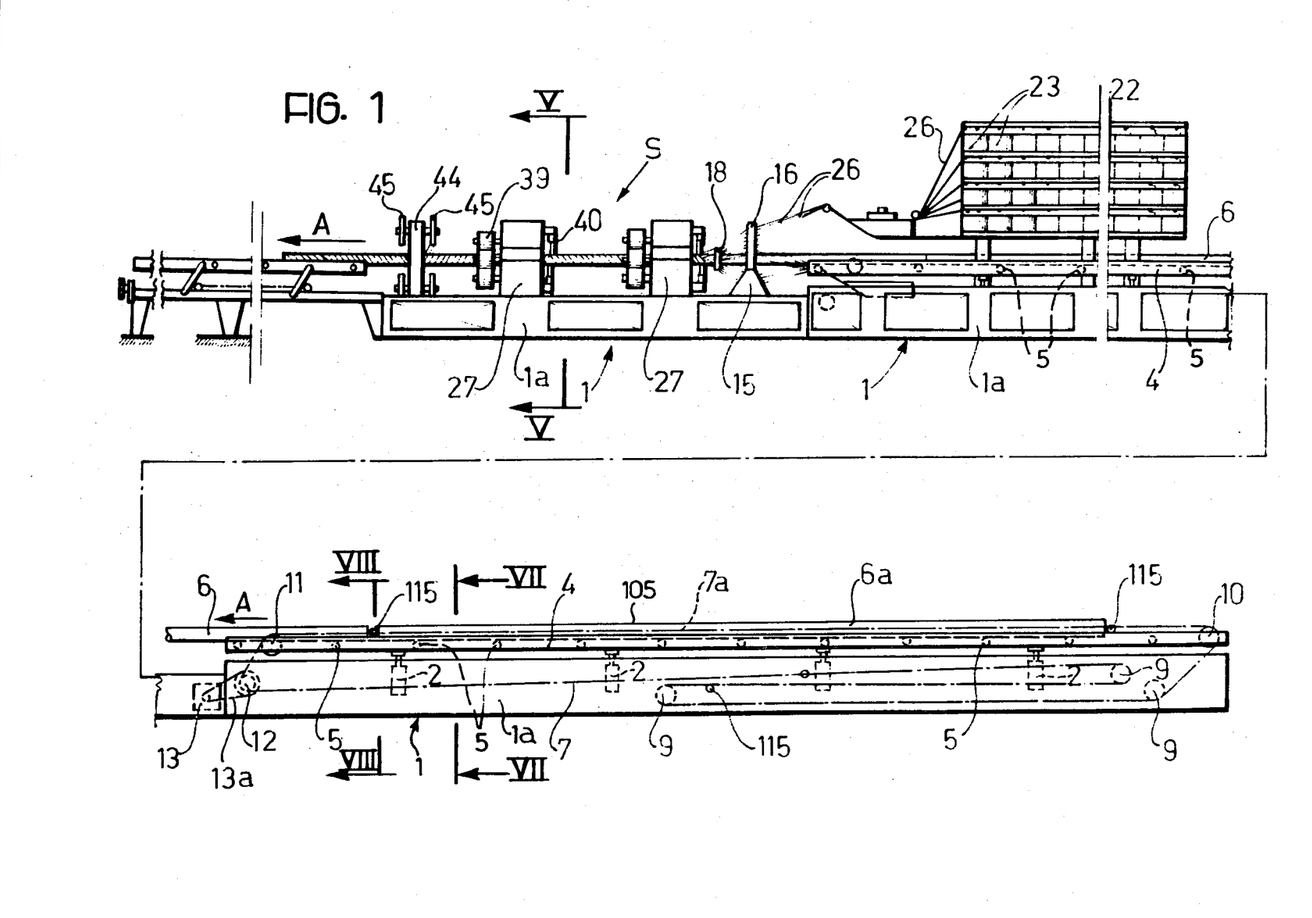
FIG. 1 is a schematic side view of the apparatus.
Figure 3:
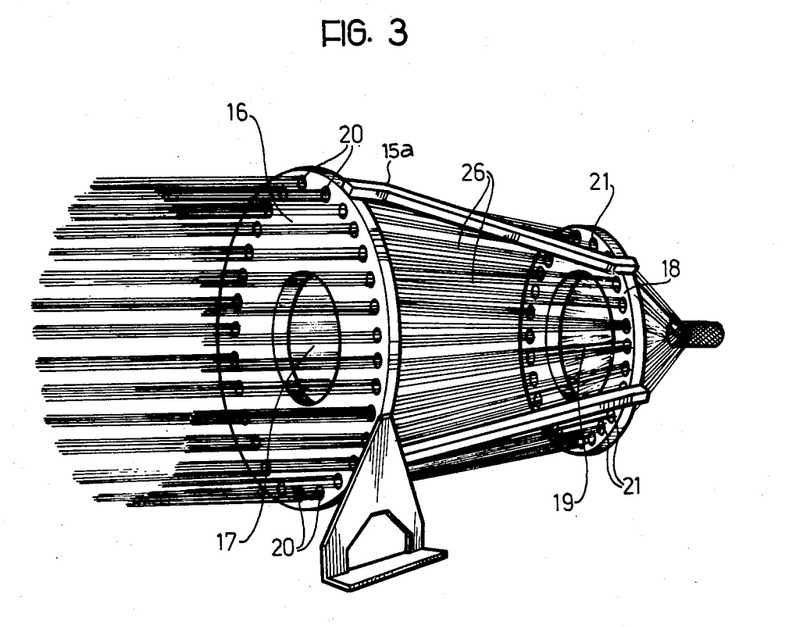
FIG. 3 illustrates schematically a detail of the longitudinal wires application station, used in the apparatus of the previous Figures.

By this means the longitudinal reinforcing threads 26 can correctly adhere to the external surfaces of both the contiguous cores and also the winding of the threads 39a and of the film 45 can take place with continuity, forming a continuous tubular body.

Further, at the moment of the separation of the poles, which takes place in the zones of maximum diameter and in those of minimum diameter of the continuous tubular body by means of a conventional cutting means, there will not, in practice, be any considerable waste.

Lastly, proceeding in the above illustrated way, the advance of the core 6 can also take place by means of the push exerted on the newly introduced core in that the other cores which preceded are in contact with each other at their respective ends.

I claim:

1. Apparatus for the continuous manufacture of cylindrical or conical tubular poles of reinforced plastic material, comprising, in combination, base means defining a guide path adapted to sequentially receive prefabricated tubular cores, means for continuously advancing a prefabricated tubular core along said guide path, applicator means supported by said base means and adapted to apply resin impregnated reinforcing threads longitudinally along and in circumferentially spaced relation about a prefabricated tubular core as it passes along said guide path, means for supplying a plurality of resin impregnated reinforcing threads to said applicator means, spiral winding means including a hollow cylindrical drum rotatably supported by said base means in coaxial relation with said guide path downstream of said applicator means in the direction of advance of said core, means disposed within said drum defining an annular chamber internally thereof having a plurality of recesses spaced circumferentially about said chamber and-- was inserted; adapted to contain a bath of resin, a plurality of bobbins rotatably supported on said drum for rotation about axes disposed parallel to said guide path, said bobbins being equidistantly spaced from the axis of rotation of said drum in equidistantly circumferentially spaced relation about said drum and each supporting a length of reinforcing thread, a plurality of thread guides corresponding in number to said bobbins and being mounted on said drum externally of said annular chamber in a position to receive a thread from an associated one of said bobbins, said thread guides each extending substantially radially toward the axis of rotation of said drum so as to be disposed in closer proximity to said drum axis than said annular chamber, means supported on said drum for guiding a thread from each bobbin through one of said recesses to a corresponding thread guide, and means operatively associated with said drum for effecting rotation thereof about the axis of said guide path so as to effect spiral winding of resin impregnated reinforcing threads from said thread guides circumferentially about said hollow core and said longitudinal reinforcing threads thereon as said core is passed through said rotating drum.

2. Apparatus for the continuous manufacture of cylindrical or conical tubular poles of reinforced plastic material, comprising, in combination, base means defining a guide path adapted to sequentially receive prefabricated tubular cores, means for continuously advancing a prefabricated tubular core along said guide path, applicator means supported by said base means and adapted to apply resin impregnated reinforcing threads longitudinally along and in circumferentially spaced relation about a prefabricated tubular core as it passes along said guide path, means for supplying a plurality of resin impregnated reinforcing threads to said applicator means, spiral winding means including a first hollow cylindrical drum rotatably supported by said base means in coaxial relation with said guide path downstream of said applicator means in the direction of advance of said core, said winding means including a second annular drum supported coaxially within said hollow cylindrical drum and defining an annular chamber internally thereof adapted to contain a bath of resin, a plurality of bobbins rotatably supported on said drum for rotation about axes disposed parallel to said guide path, said bobbins being equidistantly spaced from the axis of rotation of said drum in equidistantly circumferentially spaced relation about said drum and each supporting a length of reinforcing thread, a plurality of thread guides corresponding in number to said bobbins and being mounted on said drum in a position to receive a thread from an associated one of said bobbins, said thread guides each extending radially toward the axis of rotation of said drum, said second annular drum having a plurality of radially outwardly extending recesses formed therein extending in the longitudinal direction of said second annular drum, said recesses being disposed in circumferentially spaced relation about said second annular drum and each corresponding to one of said bobbins and its associated thread guide, said second annular drum including means operatively associated with each of said recesses for guiding a thread therethrough from an associated one of said bobbins to a corresponding thread guide, and means operatively associated with said drum for effecting rotation thereof about the axis of said guide path so as to effect spiral winding of reinforcing threads from said thread guide circumferentially about said hollow core and said longitudinal reinforcing threads thereon as said core is passed through said rotating drum, said second annular drum being rotatable with said hollow cylindrical drum so that resin disposed within said annular chamber is caused to fill each of said recesses during rotation of said second annular drum whereby a thread drawn through each of said recesses is impregnated with resin prior to being spirally wound on a core and associated longitudinal reinforcing threads passed axially through said hollow cylindrical drum.

3. Apparatus as defined in claim 1 including a second identical spiral winding means mounted on said base means coaxially with said guide path downstream of said first spiral winding means, said second spiral winding means being adapted to spirally wind resin impregnated reinforcing threads about a core and associated longitudinal reinforcing threads thereon in an opposite spiral direction from the spiral threads applied by said first spiral winding means.

* * * * *